July 19, 1949.  W. M. FRAZER  2,476,591
PHOTOGRAPHER'S COMPUTING DEVICE
Filed Dec. 4, 1947  3 Sheets-Sheet 1
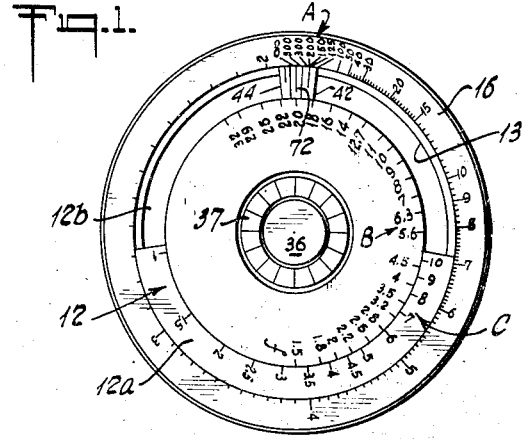
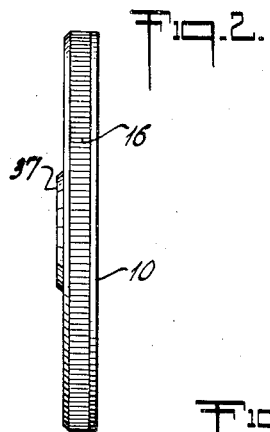
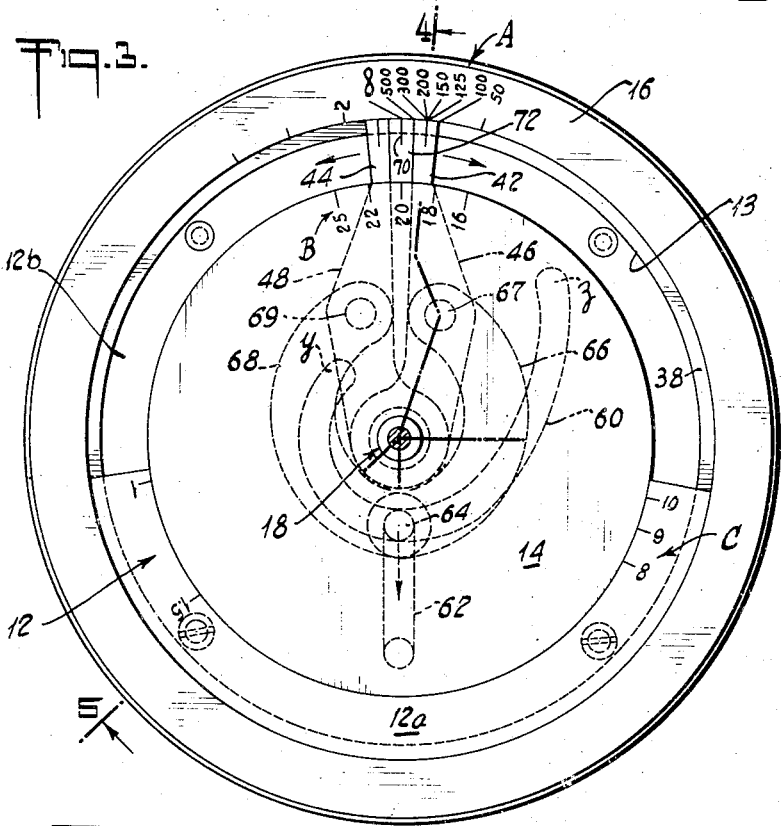
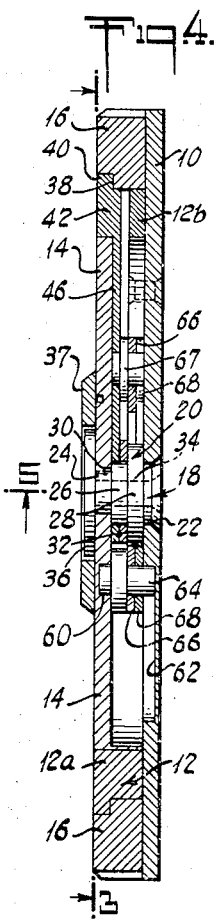
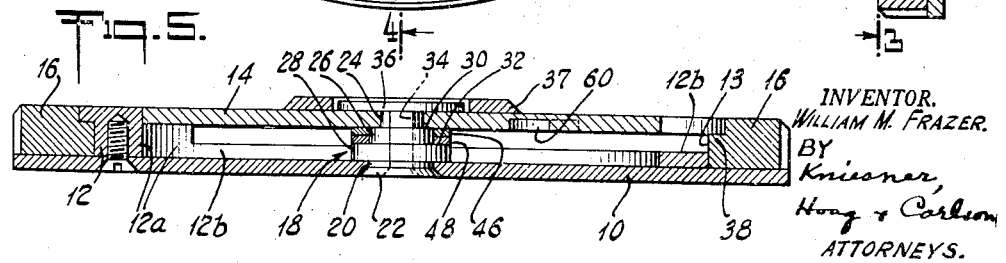
INVENTOR.
WILLIAM M. FRAZER.
BY
Kniesner,
Hoag & Carlson
ATTORNEYS.

July 19, 1949.  W. M. FRAZER  2,476,591
PHOTOGRAPHER'S COMPUTING DEVICE
Filed Dec. 4, 1947  3 Sheets-Sheet 2
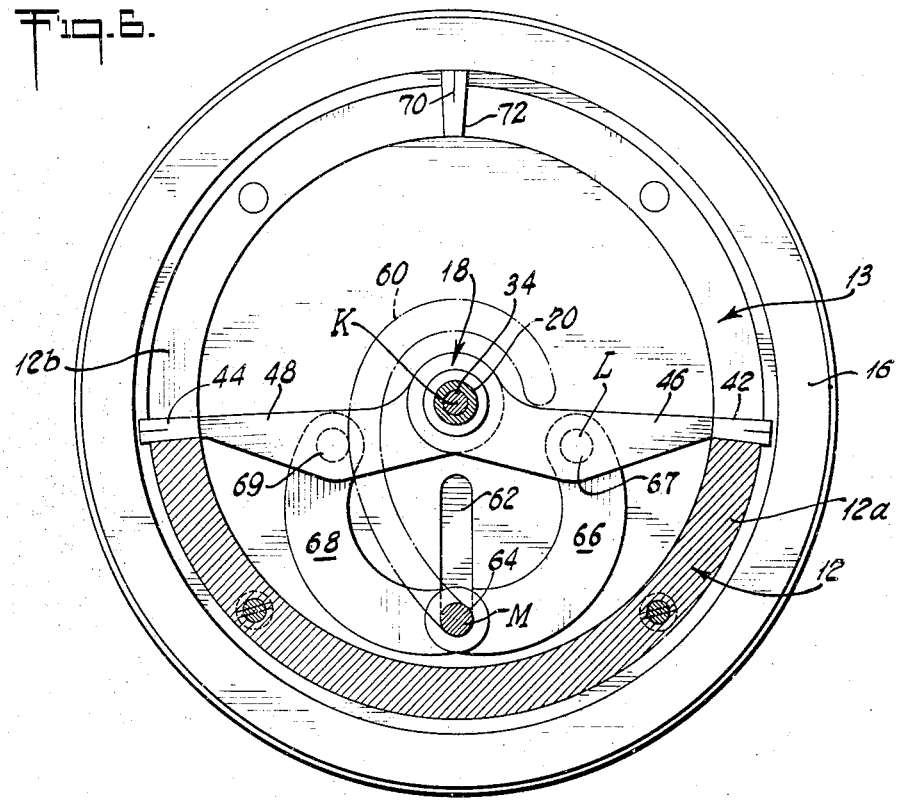
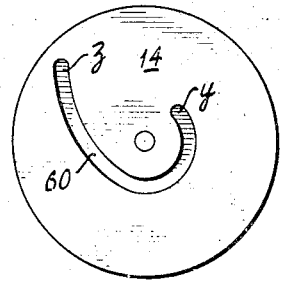
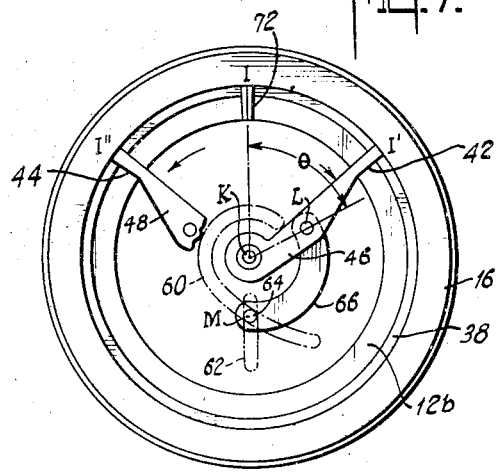
INVENTOR.
WILLIAM M. FRAZER.
BY
Kniesner, Hoag & Carlson
ATTORNEYS.

July 19, 1949.  W. M. FRAZER  2,476,591

PHOTOGRAPHER'S COMPUTING DEVICE

Filed Dec. 4, 1947  3 Sheets-Sheet 3

INVENTOR.
WILLIAM M. FRAZER.

BY
Kniesner, Hoag + Carlson
ATTORNEYS.

Patented July 19, 1949

2,476,591

UNITED STATES PATENT OFFICE 2,476,591

PHOTOGRAPHER'S COMPUTING DEVICE

William M. Frazer, Westport, Conn.

Application December 4, 1947, Serial No. 789,589

3 Claims. (Cl. 235—64.7)

This invention relates to a computing device for determining any one of the three variables, lens focal length, size of camera opening, and depth of focus, when the other two of said variables are known.

Heretofore some cameras have been provided with means for indicating depth of focus i. e. the distance, both in front of, and behind, a given sharply focused object, within which objects will also be sufficiently in focus to satisfy the particular desires or needs of the user, using the lens with which the camera is equipped, and any one of the camera openings which may be selectively chosen and which are frequently referred to as the "stops" of the camera. Such cameras, however, do not tell the user what lens focal length he must use with a given opening to obtain a desired depth of focus, or whether it will be possible for him to obtain the desired depth of focus with a particular camera opening, using a lens of the focal length of the lens with which the camera is equipped. Furthermore the depth of focus readings given on such cameras are individual to the particular camera and are functions of the respective camera openings and the focal length of the particular lens with which the camera is equipped.

The device disclosed herein is an independent calculator, adapted, like a light meter, for use with various makes and styles of cameras.

While slide rule means have been suggested by which one of said variables can be determined when the other two are known such devices require considerable skill to operate and are therefore not satisfactory for general use.

An object of this invention is to provide a simple and practical device of the above described kind.

Another object of the invention is to provide a device equipped with pointers adapted to visually indicate the limits of the depth or range of focus obtainable with a lens of a given focal length and using a given camera opening.

Another object of the invention is to provide a device for mechanically determining the range of focus of any camera using a lens of a known focal length and a particular camera opening.

Another object of the invention is to provide a device adapted to indicate whether a desired depth or range of focus can be obtained with a lens of the focal length of a lens in a camera, using a particular camera opening, or whether a lens of a different focal length must be substituted.

Another object of the invention is to provide a device by which the user may determine which size of camera opening to use to obtain a desired range of focus using a lens of a given focal length.

Another object of the invention is to provide an improved device of the above indicated kind.

Other objects of the invention will be in part obvious or in part pointed out hereinafter.

The invention accordingly consists in the features of construction, combinations of elements, arrangements of parts and in several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a top plan view of a computing device embodying the invention;

Figure 2 is an end view of the device shown in Figure 1;

Figure 3 is a top plan view similar to Figure 1 but with pointer arms, and means by which the positions of the pointer arms are controlled, indicated in dotted lines;

Figure 4 is a view partly in cross section taken on the line 4—4 of Figure 3;

Figure 5 is another view partly in section taken on the line 5—5 of Figure 3;

Figure 6 is a view similar to Figure 3 with the plate 14 removed, and showing the pointer arms separated to the limit possible in the illustrated embodiment of the invention;

Figure 6a is a plan view of the under face of plate 14 showing the cam groove cut therein;

Figure 7 is a view of the under side of plate 14 showing the cam groove therein;

Figure 8:
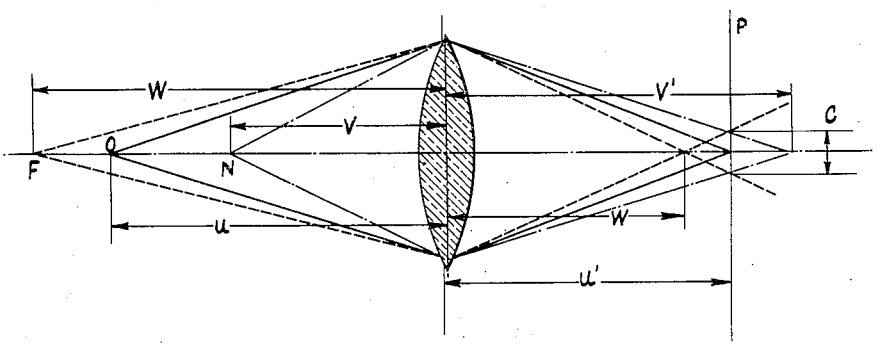
Figure 8 is a diagrammatic view illustrating the range of focus with respect to sharply focused object O.

In the embodiment of the invention illustrated in the drawings a computing device is shown comprising a base plate 10 on which a ring member 12, having portions 12ª and 12ᵇ of differential height, is mounted in fixed position intermediate a circular plate 14, and an outer annular ring 16. The plate 14, the ring 12, and the outer ring 16, are all mounted concentrically around axial stud member 10 which projects upwardly from base 10. As illustrated, this stud is a rivet-like member comprising, an outer sleeve 20, having an enlarged head 22 received in a recess in the base 10, and the three portions 24, 26 and 28 of progressively increasing diameter from top to bottom of the sleeve, providing shoulders 30 and 32. Fitting within the outer sleeve 20 an inner sleeve member 34 is received, having at its upper end a head 36 which is of sufficient diameter to overlie a substantial portion of the plate 14 which rests upon shoulder 30 and is retained in position by said head 36. Surrounding stud head 36 is a knurled knob 37 which is fixed to plate 14 and facilitates rotating plate 14.

Ring 12 is divided into portions 12a and 12b of differential height. Portion 12a and 12b each comprise approximately 180° of ring 12. Portion 12a is higher than portion 12b and its top surface is substantially flush with the top of plate 14 and the top of ring 16. There is thus provided a semi-annular space or track 13 between the outer periphery of plate 14 and the inner periphery of ring 16, above the portion 12b of ring 12. Outer ring 16 is stepped on its inner periphery at 38 to receive the radially projecting flange 49 on the higher portion 12a of ring 12 which thus serves to limit upward displacement of the ring 16.

It will thus be seen that as illustrated herein, plate 14 and ring 16 are rotatable with respect to the fixed ring 12.

Received in the semi-annular space or track 13 are the heads 42 and 44 of the pointer arms 46 and 48 which at their inner ends are pivotally mounted on axial stud 18, around the portion 26 thereof. The pointer heads have a radially projecting portion or flange 40a at their outer ends respectively, adapted to overlie and travel on the step 38 of ring 16. The pointer arms 46 and 48 are co-related with plate 14 for movement together as will be explained.

The ring 16, on its top surface along its inner periphery, is calibrated with a scale A of the reciprocals of object distances. Plate 14 is marked on its top surface, around its periphery, with a scale B of logarithmic calibrations of camera openings. The higher, substantially semi-annular portion 12a of ring 12 is similarly calibrated on its top surface, along its inner periphery, with a scale C of logarithmic calibrations of lens focal lengths.

On the under face of plate 14 a cam groove 60 is cut, the shape of which is determined as will be described. In the upper face of base 10 a guide slot 62 is provided, which, as shown herein, is disposed radially with respect to plate 14 and its axis 18, and extending between the base plate and the face plate, with its lower end slideably engaged in said radial slot and its upper end slideably engaged in said cam slot, is a stud 64 which thus serves as a cam follower. The curved and oppositely disposed arms 66 and 68 are rotatably mounted at one end on stud 64 and their other ends are pivotally connected by pivots 67 and 69 to the pointer arms 46 and 48 respectively, intermediate the ends of said pointer arms.

Reference to the drawings and particularly to Figure 3 will show that the shape of the cam groove 60 is such that when the plate 14 is rotated the stud 64 will be forced outwardly in guide slot 62 and this motion will cause curved arms 66 and 68 to move apart from their abutting relationship as shown in Figure 3 and to swing in opposite directions. The length of the cam slot is such that when the pointer arms 46 and 48 are in abutting relationship stud 64 will be substantially at the left hand end y of the cam groove as viewed in Figure 3, and, when the pointers 46 and 48 are spread widely apart with their enlarged heads 42 and 44 at the outer limits of the semi-annular space or track 13, where they will be abutting against the opposite ends of the higher portion 12a of said ring 12, stud 64 will be substantially at the end z of the cam groove. Movement of the stud 64 toward the end y of the cam groove, causes the arms to move toward one another and causes stud 64 to move inwardly in the guide slot 62, and movement of the stud 64 to the end z of the cam groove 60 will cause stud 64 to move outwardly in guide slot 62, in the direction of the arrow 63.

A radially extending line of reference 70 may be marked on the top of the portion 12b of ring 12, in operative relation to the scale of object distances (scale A) on ring 16, and positioned so that when the pointer arms are in abutting relation to one another their line of contact will be coincident with it. Preferably the ring portion 12b is elevated where its surface is marked with the line of reference 70 providing a narrow elevated island 72 thus bringing mark 70 on a level with the ring 16 to facilitate positioning of scale A thereon relative to the mark 70.

Since the plate 14 and the pointers 46 and 48 are interconnected through the stud 64, the pointers will be moved when plate 14 is rotated and vice versa. Thus if plate 14 is rotated to bring a desired camera opening graduation thereon opposite a selected lens focal length graduation on the portion 12a of ring 12 the pointer arms 46 and 48 will be actuated, and contrariwise, if the pointer arms are moved manually, for example, to point to object distances near and far of a given object distance, the plate 14 will be rotated thus changing the position of the camera opening scale (scale B) thereon in relation to the lens focal length scale (scale C) on the portion 12a of the ring 12.

Figure 10:
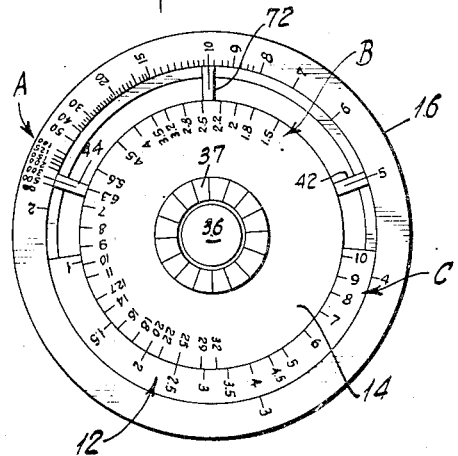
Figure 10 is another view similar to Figures 1 and 9 showing the scales positioned to solve two other problems stated herein.

In employing the device disclosed herein the graduation on scale A which will be placed opposite the mark, or line of reference 70, on the surface of ring portion 12b, and the graduation on scales B and C which will be placed opposite one another, will depend on which of the three variables consisting of lens focal length, size of camera opening, and depth of focus is unknown and to be computed. The practical use of the device is illustrated by the following three examples:

1. If it is desired to determine which camera opening should be used to insure that an object 5 ft. from the camera will be within the range of focus when the camera is set for sharp focus on an object 10 ft. away, and assuming that the focal length of the lens of the camera is 2 inches, ring 16, on which scale A, the scale of object distances, is marked, will first be rotated until the graduation 10 of scale A is opposite the mark 70. Plate 14 is next rotated, as by means of the knurled knob 37 until the center mark on the head of pointer arm 48 is opposite the graduation 5 of scale A. The camera opening graduation (scale B on plate 14) opposite the 2 inch graduation on the focal length scale C (on ring portion 12a) now indicates the camera opening to use. This computation is illustrated in Figure 10, and reference to the camera opening or B scale as shown in that figure shows that the camera opening or stop number graduation 20 is opposite the 2 inch graduation on the focal length scale, meaning that the aperture identified on the camera as F/20 should be used.

Figure 9:
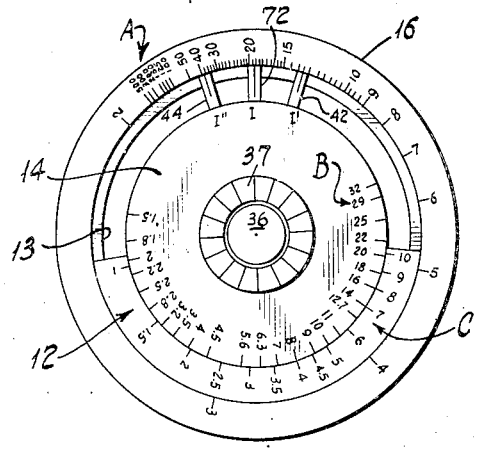
Figure 9 is a view similar to Figure 1 showing the scales positioned to solve a problem stated herein.

2. For an example of another use of the computing device assume that it is desired to find the nearest and furthest distances which will be within the range of focus when a camera, equipped with a lens of 4 inch focal length, and using the camera opening F/8, is sharply focused on an object 20 ft. away. In order to solve this problem plate 14 is rotated to bring number 8 of the camera opening scale B thereon opposite the 4 inch graduation on the focal length scale C on ring portion 12a, as is illustrated in Figure 9. Now rotate ring 16 until the 20 ft. graduation of scale A thereon is opposite the mark or line of reference 70. The center lines on the heads of the pointers 46 and 48 will then point to 38 ft. and to 13 ft. 6 in., respectively, which are the nearest and furthest distances within the range of focus.

3. As a third application of the computing device assume that it is desired to find the lens focal length required to insure that an object 5 ft. from the camera will be within the range of focus when the camera is sharply focused on an object 10 ft. away, using camera opening F/20. The solution of this problem is similar to the first illustration given above, and is also illustrated by the relative position of scales B and C as shown in Figure 10. The proper lens focal length is found by rotating scale A until 10 on that scale is opposite the mark or line of reference 70. Plate 14 is then rotated until the center line on the head of pointer 46 points to the graduation 5 on the distance scale A. The graduation on the lens focal length scale C which is opposite the graduation 20 on the camera opening scale indicates the proper focal length to use, and as is illustrated in Figure 10, the graduation on the focal length scale opposite 20 of the camera opening scale is 2, showing that the proper lens to use is one having a focal length of 2 inches.

Figure 8 has been included in the drawings to facilitate a complete understanding of the construction of my computer, and the problems which it is adapted to solve. Referring to Figure 8, assume that lens L represents a simple bi-convex lens, and that the rays from an object point O are sharply focused on the photographic film or plate P. It will be observed that the rays from a more distant object point F come to a focus a short distance before the plate, and diverge again to form a "circle of confusion" of light on the plate. Similarly the rays from a nearer object point N will be intercepted by the film before coming to a focus, and form a circle of confusion. If this circle of confusion is not too large, all objects within the circle will be reproduced on the film substantially in focus. The size of this circle which is permissable will depend upon how sharply it is desired to reproduce all objects therein. This will differ depending on the use for which the film is intended. Let it be assumed herein that all points within a circle having a diameter approximately $\frac{1}{1000}$ of the focal length of lens D will be satisfactorily "in focus."

To determine the distance of the nearest object point N, in the focal range when the camera is focused on the point O, we find from Figure 8, by simple proportion $$\frac{D}{C} = \frac{v'}{v' - u'}$$

where $D$ is the diameter of the lens aperture
$C$ is the diameter of the circle of confusion
$u'$ is the distance of the sharply focused image from the lens, and
$v'$ is the distance of the slightly blurred image from the lens.

This proportion may also be written $$\frac{1}{v'} = \left(\frac{D-C}{C}\right)\frac{1}{u'}$$

From a fundamental law of optical imagery, object and image distances are related by the following equation:

$$\frac{1}{u'} = \frac{1}{u} + \frac{1}{f}$$

also $$\frac{1}{v'} = \frac{1}{v} + \frac{1}{f}$$

where $u$ is the distance of the object point O from the lens
$v$ is the distance of the object point N from the lens, and
$f$ is the equivalent focal length of the lens.

Making use of these relations, we obtain the object distance, $v$, in terms of D, C, $u$, and $f$:

$$\frac{1}{v} = \left(\frac{D-C}{D}\right)\frac{1}{u} - \frac{C}{D \cdot f}$$

This last equation can be simplified somewhat. Since the diameter of the lens aperture D will always be several hundred times larger than the diameter of the circle of confusion C, the term $$\frac{D-C}{D}$$

will never differ greatly from the value 1, and hence, to a sufficient degree of accuracy, $$\frac{1}{v} = \frac{1}{u} - \frac{C}{D \cdot f}$$

By an analagous line of reasoning, we can find that farthest object distance $w$ beyond the object point O which will cause a circle of confusion of diameter C. This object distance will be expressed by the equation $$\frac{1}{w} = \frac{1}{u} + \frac{C}{D \cdot f}$$

The computing device must solve the last two equations. The diameter D of the lens aperture can be determined from the speed index or "F/number" and the focal length of the lens, i. e.

$$D = \frac{f}{F/\#}$$

Since it has been assumed that the circle of confusion or blur circle in the final picture will subtend an angle at the eye of approximately 3 minutes of arc or less, which requires the diameter of C to be approximately $\frac{1}{1000}$ of the focal length or less, the two computing equations can therefore be written $$\frac{1}{v} = \frac{1}{u} - \frac{.001 F/\#}{f}$$

and $$\frac{1}{w} = \frac{1}{u} + \frac{.001 F/\#}{f}$$

The computing device is constructed to solve simultaneously both of these equations.

Scale C is calibrated in terms of log $f$. Since this scale cannot extend more than about 160° of the entire circumference of the circle due to the mechanical construction, the angular calibration was determined by the factor 160° log $f$ which allows a range of focal lengths from 1" (log 1=0) to 10 inches (log 10=1.000). The calibrations were divided equally on both sides of the vertical.

Scale B was similarly determined by the factor 160° log F/# (F/# being the symbol for camera opening or "stop" number) and covers the range from F/1.5 to F/32. Since log 1.5=.17609, and log 32=1.50515, the total angular spread of the F/# scale=160° (1.50515−.17609)=212.65°. The relative positions of scales B and C therefore gives us the division $$\frac{F/\#}{f}$$

since $$\log\frac{F/\#}{f} = \log F/\# - \log f$$

The total range of movement of the pointers 46 and 48 is from abutting positions abutting the raised island 72 on which line 70 is marked to positions approximately 180° apart. The maximum range from the near to far object distances computed by the device is therefore determined by this range. If we assume, as a practical limit, the shortest focal length (1") will not be used at an F/# larger than F/11, the maximum range in feet required can be determined by the two computing equations. Since the far distance $v=\infty$, the object distance $u$ can be determined:

$$\frac{1}{\infty} = 0 = \frac{1}{u} - \frac{.001 F/\#}{f}$$

or $$\frac{1}{u} = \frac{.001 F/\#}{f}$$

The near distance $$\frac{1}{w} = \frac{1}{u} + \frac{.001 F/\#}{f}$$

$$\therefore \frac{1}{w} = \frac{.001 F/\#}{f} + \frac{.001 F/\#}{f}$$

$$\frac{1}{w} = \frac{2(.001 \cdot 11)}{1 \text{ inch}} = \frac{2 \times .011}{\frac{1}{12} \text{ ft.}} = 24 \times .011$$

$$w = \frac{1}{24 \times .011} = 3.8 \text{ ft.}$$

This means therefore that the calibration of the A or object distance scale can be computed from the formula $$\theta = 180° \times \frac{3.8}{u}$$

The entire range, from 2 ft. to infinity covers $$180 \times \frac{3.8}{2} = 342°$$

of the circumference of the range scale.

The calculation of the cam groove 60 will be determined by the calibrations on the three scales, and by the dimensions of the pointer arms 46 and 48, and the curved arms 66 and 68 inside the mechanism. In the following calculations it is assumed that the physical dimensions of the space beneath the plate 14 permit a 90° movement of the pointers, and that the dimension KL on the indicator arm (Figure 6) is approximately ½ inch, and the dimension LM on the link is about .8 inch, K representing the axis 18 of the pointers, L representing one of the pivots 67 or 69, and M representing the stud 64.

The position of indicator arms 46 and 48 is determined by means of the link, and the position of the point M. The location of M is in turn located by the cam groove 60, and the guide slot 62. The cam groove therefore must give the coordinate KM in accordance with the function $$\frac{.001 F/\#}{f}$$

as determined by the relative positions of the B and C scales. Reference to Figure 6 shows that the relationship between the three pivotal points K, L and M, may be expressed, $$KM = \sqrt{LM^2 - KL^2 \sin^2 \theta} - KL \cos \theta$$

where KM is the radial coordinate of the cam groove, and $\theta$ is the angle between either pointer 46 and 48 from the fixed mark or reference line 70. We have previously found that $\theta$ is a function of the range $u$, which in turn is a function of the F/# and the focal length. The dimension KM may be determined by substituting the dimensions of KL and LM in the above equation. For example, the radial distance KM of the cam groove for a point corresponding to a setting of 1" (one inch) on the focal length scale and F/4.5 on the F/# scale would be determined as follows:

$$\frac{1}{u} = \frac{.001(4.5)}{\frac{1}{12} \text{ ft.}}$$

$$u = 18.52 \text{ ft.}$$

This requires an angle between pointers 46 and 48

$$\theta = \frac{180 \cdot (3.8)}{18.5} = 36.9°$$

Therefore $$KM = \sqrt{(.8262)^2 - .5^2 (\sin 36.9°)^2} - .50 \cos 36.9°$$

$$= \sqrt{.6826 - .0900} - .4000$$

$$= .7746 - .4000$$

$$= .3746"$$

Similarly, the dimension KM can be computed for each position of the B scale.

The computer described above may be a compact instrument of a size on the order of the light meters used by photographers. Being a separate device it is available for use in connection with any camera, and it has the advantage that it is simple to operate and adapted to speedily solve any of the various photographic problems referred to above.

It will thus be seen that there has been provided by this invention an apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. A computing device for determining for any camera the lens focal length to be used with a given camera opening to obtain a desired range of focus, or the camera opening to be employed to obtain a desired range of focus with a lens of given focal length, or the depth of focus obtainable with a lens of a given focal length using a given camera opening and whether an object at a given distance will be within the range of focus, which comprises, a base, a stud extending upwardly from said base and adapted to serve as the axis for a number of superimposed elements, a circular plate mounted for rotation around said stud and having thereon a scale of logarithmic calibrations of camera openings, a ring rotatably mounted on said base concentrically with said plate and having thereon a scale of the reciprocals of object distances, said ring being spaced radially outwardly from said plate leaving an annular space therebetween, another ring fixed on said base within said space having a semi-annular portion of substantially the full height of said space, and a semi-annular portion only partially filling said space vertically and so leaving a space above it between said plate and said ring, said portion of full height having thereon a scale of logarithmic cadibrations of lens focal lengths, a guide slot in said base, a cam groove cut in the under face of said plate, a stud having its lower end slidably enaged in the said guide slot and having its upper end slideably engaged in said cam slot and serving as a cam follower, a pair of pointer arms rotatably mounted on said axial stud, a plurality of curved and oppositely positioned arms each pivoted at one end on said cam follower stud, and each pivotally connected at its other end to one of said pointer arms respectively, intermediate its ends, said cam groove being disposed relative to said guide slot so that movement of the plate or the pointer arms causes movement of said cam follower stud with resulting and proportionate movement of the pointer arms or the plate.

2. A photographer's computing device for determining any one of the three variables of lens focal length, camera opening, and depth of focus, when the other two of said variables are known, comprising, a segment of a ring having thereon a scale of logarithmic calibrations of lens focal lengths, a circular plate having thereon a scale of logarithmic calibrations of camera openings, and a ring having thereon a scale of the reciprocals of object distances, said members being coaxially mounted and disposed with said segment between said plate and said ring thus leaving a semi-annular space between said plate and said ring beyond the extremities of said segment, said segment being stationary and said plate and ring rotatable, and a pair of pointers mounted coaxially with said members for rotative movement toward or away from one another, said pointers each comprising a head portion adapted to fit into and travel in the said semi-annular space between said plate and said ring, said plate having a cam groove cut in one face thereof, a base member having a guide slot, and a stud one end of which is slideably engaged in said guide slot and the other end of which is slideably engaged in said cam slot, and a pair of links pivotally connected between said stud and said pointer arms respectively, said cam groove serving when said plate is rotated to control the position of the pointer arms to cause them to assume positions corresponding to functions of camera openings and lens focal lengths.

3. A photographer's computing device for determining any one of the three variables of lens focal length, camera opening, and depth of focus, when the other two of said variables are known, comprising, a segment of a ring having thereon a scale of logarithmic calibrations of lens focal lengths, a circular plate having thereon a scale of logarithmic calibrations of camera openings, and a ring having thereon a scale of the reciprocals of object distances, said members being coaxially mounted and disposed with said segment between said plate and said ring thus leaving a semi-annular space between said plate and said ring beyond the extremities of said segment, said segment being stationary and said plate and ring rotatable, and a pair of pointers mounted coaxially with said members for rotative movement toward or away from one another, said pointers each comprising a head portion adapted to fit into and travel in the said semi-annular space between said plate and said ring, said plate having a cam groove cut in one face thereof, a base member having a guide slot, and a stud one end of which is slideably engaged in said guide slot and the other end of which is slideably engaged in said cam slot, and a pair of links pivotally connected between said stud and said pointer arms respectively, said cam groove serving when said pointer arms are directly moved to control the extent of resulting rotation of said plate so that the depth of focus indicated on the scale of object distances by the spread of the pointer arms is a function of the camera openings and lens focal lengths indicated by opposed graduations on said camera opening and lens focal length scales.

WILLIAM M. FRAZER.

No references cited.